(12) United States Patent
Binnie

(10) Patent No.: US 6,651,536 B1
(45) Date of Patent: Nov. 25, 2003

(54) LATHE

(75) Inventor: Kevin Douglas Binnie, Kirrawee (AU)

(73) Assignee: K. D. Binnie Engineering Pty Ltd. (AU)

( * ) Notice: Subject to any disclaimer, the term of this patent is extended or adjusted under 35 U.S.C. 154(b) by 75 days.

(21) Appl. No.: 09/980,034

(22) PCT Filed: Jun. 22, 2000

(86) PCT No.: PCT/AU00/00705
§ 371 (c)(1),
(2), (4) Date: Nov. 26, 2001

(87) PCT Pub. No.: WO01/00359
PCT Pub. Date: Apr. 1, 2001

(30) Foreign Application Priority Data

Jun. 25, 1999 (AU) .............................................. PQ1204

(51) Int. Cl.[7] .............................. B23B 3/00; B23B 21/00
(52) U.S. Cl. ............................................ 82/122; 82/133
(58) Field of Search .......................... 82/120, 121, 122, 82/125, 126, 127, 129; 29/37 R, 38 A, 27 R, 39, 40, 41, 27 C, 27 A, 50, 51

(56) References Cited

U.S. PATENT DOCUMENTS

| | | | | | |
|---|---|---|---|---|---|
| 1,671,354 A | * | 5/1928 | Leeuw | ........................ | 29/38 A |
| 1,939,137 A | | 12/1933 | Schaerer | ........................ | 29/37 |
| 3,742,791 A | * | 7/1973 | Sato | ............................ | 82/122 |
| 4,016,784 A | * | 4/1977 | Brown | ........................ | 82/118 |
| 4,037,733 A | * | 7/1977 | Doe et al. | ..................... | 414/18 |
| 4,302,144 A | * | 11/1981 | Hallqvist | ..................... | 414/590 |
| 5,115,702 A | * | 5/1992 | Link | ........................... | 82/126 |
| 5,153,973 A | * | 10/1992 | Kitamura | .................... | 29/33 P |
| 5,452,502 A | * | 9/1995 | Walter et al. | ............... | 29/38 B |
| 5,699,598 A | * | 12/1997 | Hessbruggen et al. | ...... | 29/27 C |

* cited by examiner

Primary Examiner—A. L. Wellington
Assistant Examiner—Brian D. Walsh
(74) Attorney, Agent, or Firm—Charles Berman; Claude Nassif; Greenberg Traurig LLP

(57) ABSTRACT

A lathe (10) includes a support structure (12) which supports a magazine (14) in a substantially vertical operative orientation. The magazine (14) is rotatably supported on a carriage (24). The magazine (14) is a multi-spindle magazine and supports a plurality of workpieces. A workstation head (40) is mounted on the housing (18). The workstation head defines a plurality of workstations (46). Each workstation head includes a plurality of working tools.

8 Claims, 4 Drawing Sheets

LATHE

FIELD OF THE INVENTION

This invention relates to a machine tool. More particularly, the invention relates to a lathe.

SUMMARY OF THE INVENTION

According to the invention, there is provided a lathe which includes a support structure including a support post and a carriage slidably supported on the support post:

a magazine for holding at least one workpiece, the magazine being rotatably supported by the carriage of the support structure and being mounted on the support structure such that said at least one workpiece is arranged substantially vertically when a machining operation is performed on said at least one workpiece: and at least one workstation, having at least one working tool, mounted on the support structure such that a working tool engages an end of said workpiece to perform the machining operation while said workpiece is maintained in its vertical orientation.

The carriage may be slidable with respect to the support post such that an operative end of the magazine, ie. that end of the magazine in proximity to the workstations, can be moved out of engagement with a drive member and the magazine pivoted to lie substantially horizontally for facilitating reloading of the magazine.

The support post may be mounted on a base plate and a housing may be arranged on the base plate adjacent the support post. The housing may include a drive mechanism, coolant reservoirs, etc.

A workstation head may be mounted on the housing, the workstation head defining the, or each, workstation. The workstation head may be displaceably arranged on the housing. Firstly, the head may be rotatably displaceable with respect to the housing to facilitate the indexing of the workstations. Secondly, the workstation head may be vertically displaceable with respect to the housing along a longitudinal axis of the magazine.

The lathe may include a control means arranged intermediate the workstation head and an end of the magazine closer to the workstation head for controlling feeding of the, or each, workpiece to its associated workstation.

The control means may include a gripping means for releasably gripping the, or each, workpiece and a rotating means for rotatably driving the, or each, workpiece to enable the machining operation to be performed on the, or each, workpiece. The control means may further include a release means for enabling the workpieces to be released from the gripping means.

The gripping means may include a collet for releasably gripping each workpiece to be machined. Each collet may be mounted fast with a planetary gear. Each planetary gear may, in turn, be rotatably driven by a sun gear which is rotated via the drive motor housed in the housing. Thus, the rotating means may comprise the sun gear and the plurality of planetary gears. The release means may be a pneumatic diaphragm housed atop the collets or an electromagnetic system.

A plurality of working tools may be accommodated in said at least one workstation, said workstation being indexable relative to the magazine such that various machining operations can be sequentially carried out on a workpiece associated with said workstation.

Preferably, the magazine is a multi-spindle magazine which is able to hold a number of operative workpieces. Further, the lathe may include a plurality of workstations, one associated with each operative workpiece, so that the machining operation can be performed on each of the operative workpieces simultaneously. The magazine may be configured to hold spare workpieces in addition to each operative workpiece. By "operative workpieces" is meant those workpieces on which machining operations are being, or are to be, carried out. Then by "spare workpieces" is meant that while certain workpieces, the operative workpieces, are having machining operations carried out thereon, other workpieces, being the spare workpieces, are held in reserve adjacent their associated operative workpiece for subsequent machining operations without the need for constant supervision to reload the magazine.

As described above, each workstation may include a plurality of working tools. Thus, for example, each workstation may have a parting tool, a turning tool, a screw-cutting tool, a boring tool and a plurality of drilling tools. Those skilled in the art will, however, appreciate that the actual arrangement of tools selected will be dependent on the machining operations to be carried out on the various workpieces. However, each workstation will have the same selection of working tools.

The lathe may be computer controlled. Accordingly, a control cabinet may house control circuitry which controls operation of the lathe, in use.

BRIEF DESCRIPTION OF THE DRAWINGS

The invention is now described by way of example with reference to the accompanying drawings in which.

DETAILED DESCRIPTION OF THE DRAWINGS

Figure 1:
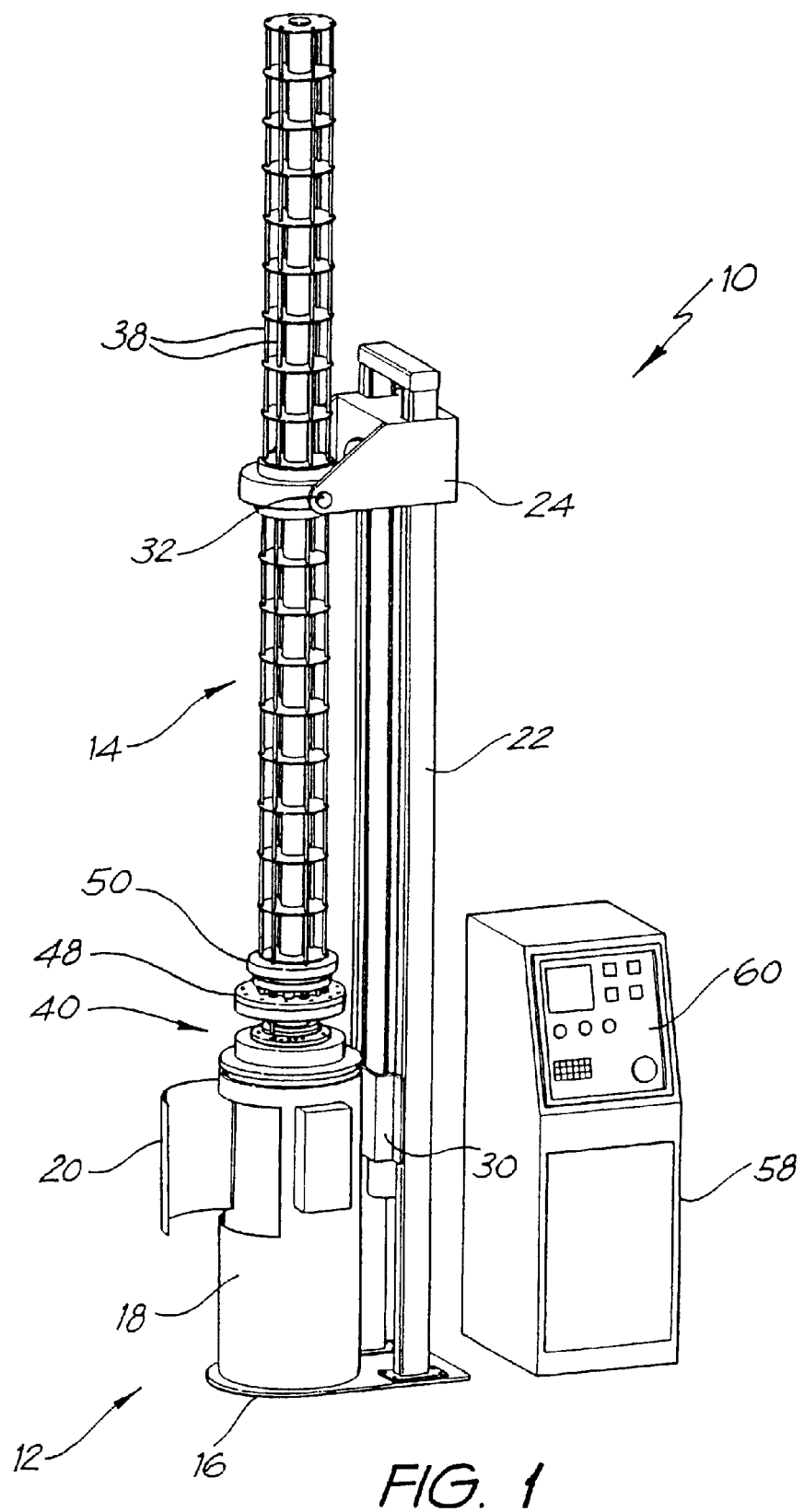
FIG. 1 shows a three dimensional view of a lathe, in accordance with the invention, with a magazine thereof in its operative position.

In the drawings, reference numeral 10 generally designates a lathe in accordance with the invention. The lathe 10 includes a support structure 12 which supports a magazine 14 in a substantially vertical, operative orientation as illustrated in FIG. 1.

The support structure 12 includes a base plate 16 on which a housing 18 is mounted. The housing 18 houses drive motors, coolant reservoirs, cooling fans, etc which are accessed through an access door 20.

Figure 4:
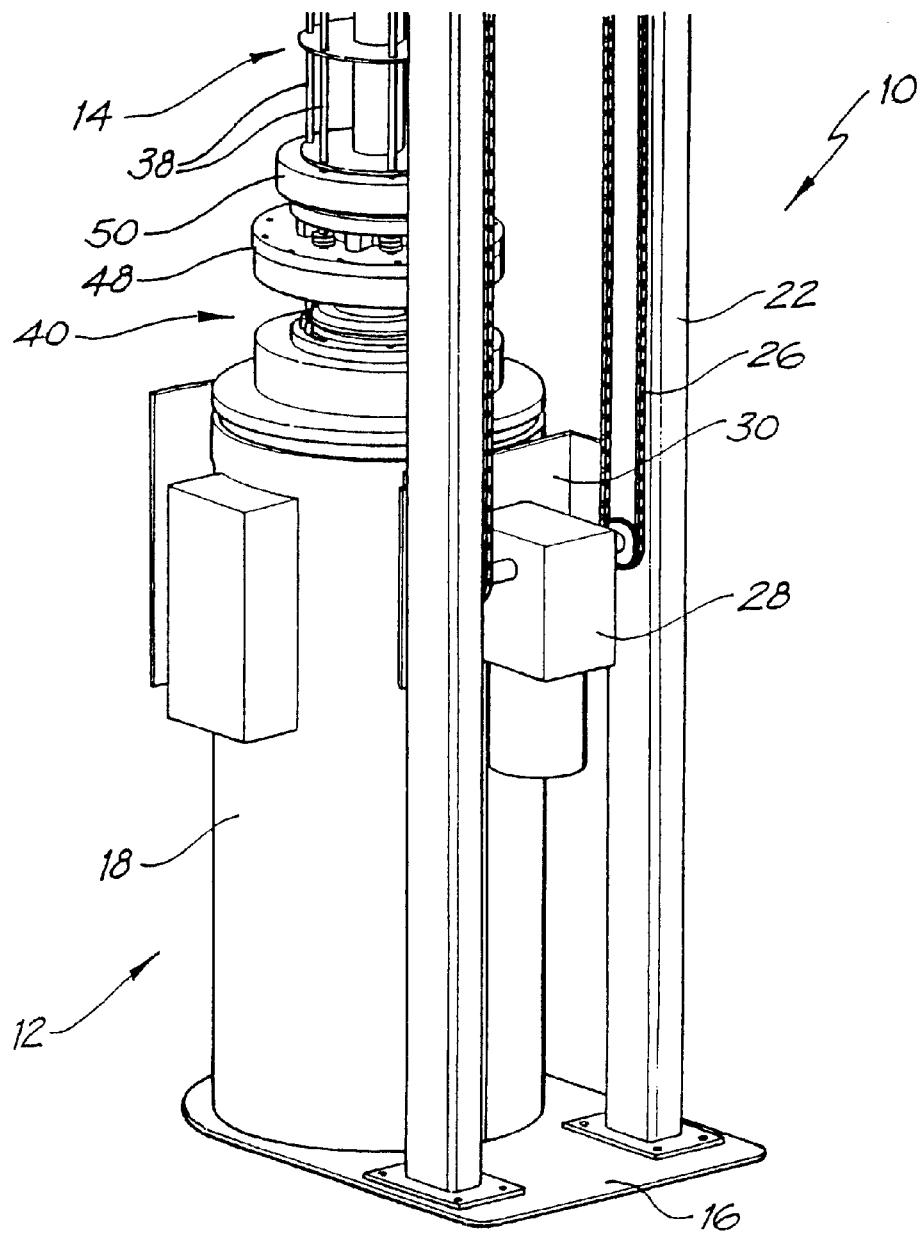
FIG. 4 shows a three dimensional rear view of part of the lathe, also on a slightly enlarged scale.

A support post 22 is mounted on the base plate 16 adjacent the housing 18. A carriage 24 is slidably mounted on the support post 22 and is driven via a chain-drive assembly 26 (FIG. 4) and a geared motor 28. The motor 28 is supported on the support post 22 by a bracket 30.

The magazine 14 is rotatably supported on the carriage 24 by a gimble arrangement 32 which includes a stewing bearing. The gimble arrangement 32 is arranged approximately midway along the length of the magazine 14.

Figure 2:
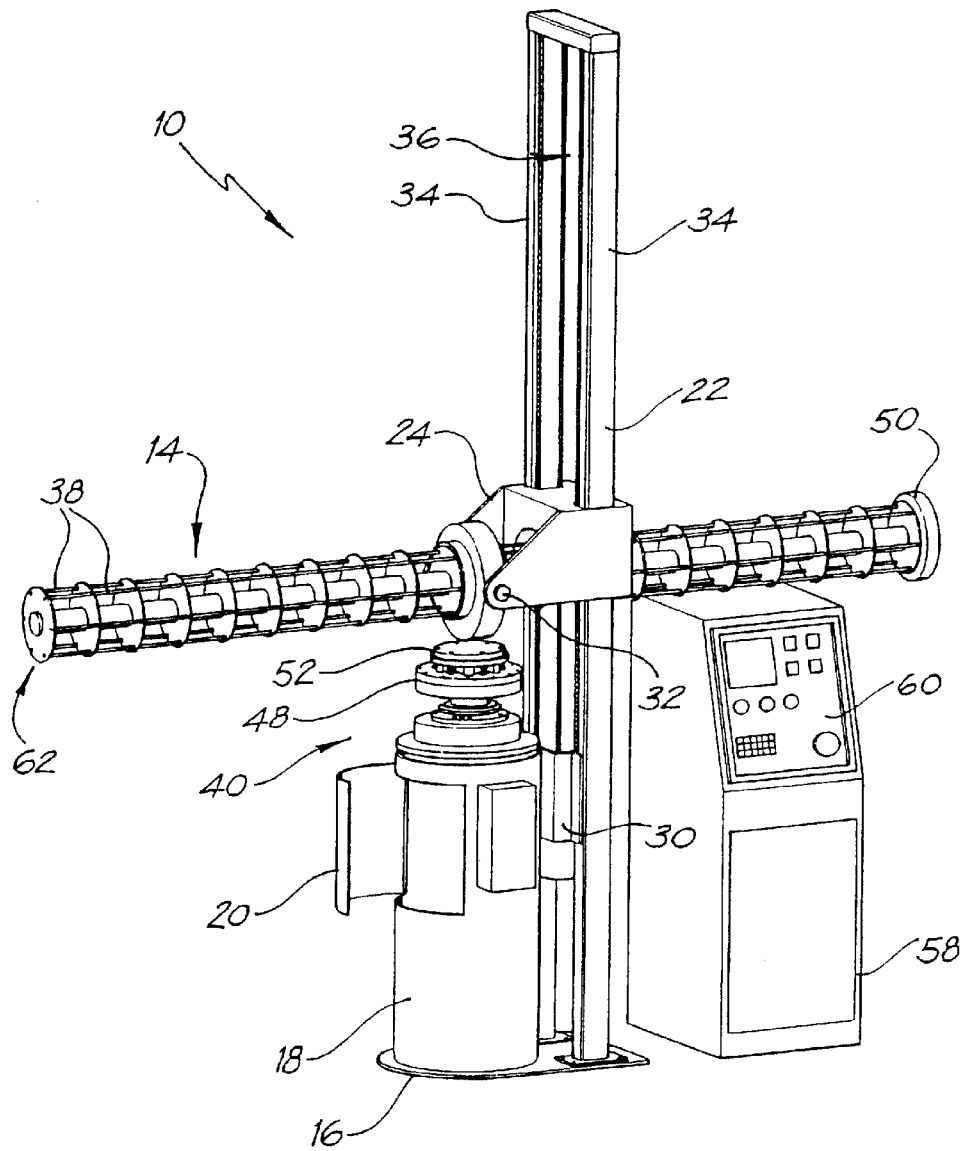
FIG. 2 shows a three dimensional view of the lathe with the magazine in its loading, inoperative position.

Further, it is to be noted that the support post 22 comprises two, spaced rails 34 defining a gap 36 between them through which the magazine 14 fits, as illustrated in FIG. 2 of the drawings, for loading the magazine 14. The loading of the magazine 14 will be described in greater detail below.

The magazine 14 is a multi-spindle magazine and supports a plurality of workpieces thereon. In the embodiment illustrated, the magazine 14 supports twenty-four workpieces, in the form of rods 38, of which six rods 38 are shown and are the "operative workpieces", as defined above, the remaining rods being "spare workpieces" also as defined above.

Figure 3:
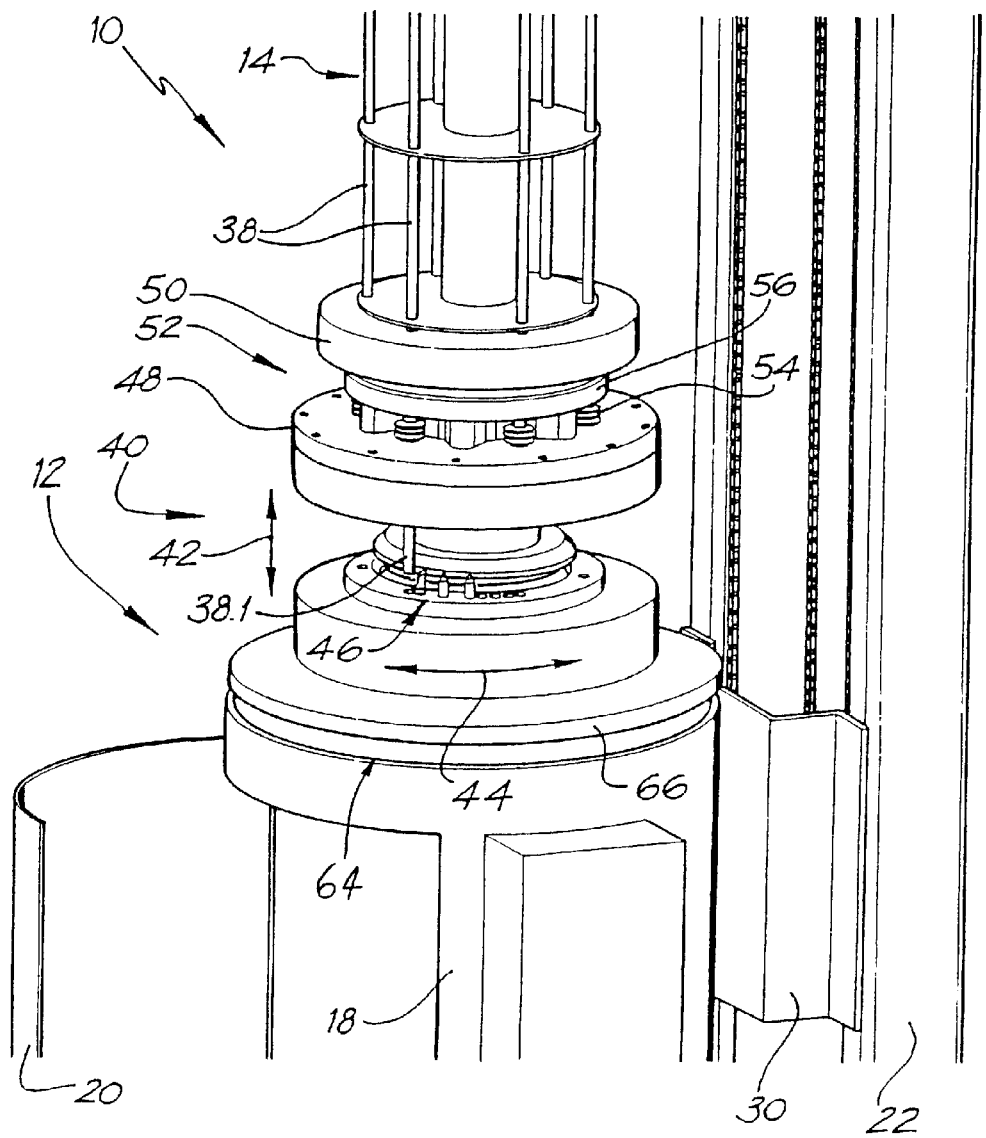
FIG. 3 shows a three dimensional front view, on an enlarged scale, of part of the lathe.

The lathe 10 includes a workstation head 40 mounted on the housing 18. The workstation head 40 is displaceable on a z-axis as indicated by arrow 42 (FIG. 3) and is also rotatable relative to the housing 18 in a horizontal or x-plane as illustrated by the arrow 44 in FIG. 3 of the drawings.

The workstation head 40 defines a plurality of workstations 46. It will be appreciated that there are an equal number of workstations 46 as there are operative workpieces or rods 38, ie., excluding the spare workpieces. Accordingly, in the illustrated embodiment, six workstations 46 are arranged at circumferenitially spaced intervals on the head 40 although only one workstation 46 is illustrated for the sake of clarity.

Each workstation 46 includes a plurality of work tools. For example, each workstation 46 has a parting tool, a turning tool, a screw-threading tool, a boring tool and a plurality of drilling tools, for example, three drilling tools.

A control means or drive head 48 is arranged intermediate an indexing plate 50 at the bottom end of the magazine 14 and the workstation head 40. The drive head 48 feeds the rods 38 to, and controls the rotation of the rods 38 relative to, the workstations 46. Due to the vertical orientation of the magazines 14, the rods 38 to be machined are fed under gravity to the workstations 46. Accordingly, a gripping means is included in the drive head 48 for gripping the rods 38 when in their operative positions. Each gripping means is in the form of a collet arranged in the drive head 48. Each collet, in turn, is mounted fast with a planetary gear (not shown) arranged in the drive head 48. The planetary gears are mounted around and are driven by a sun gear via a drive motor mounted in the housing 18 to rotate the rods 38, in use. A collet release system 52 is mounted on the drive head 48. When springs 54 of the collet release system 52 are compressed by a diaphragm 56, the collets open allowing the rods 38 to be fed to their associated workstations 46. It is to be noted in FIG. 3 of the drawings that one of the rods 38, as illustrated at 38.1, is shown extending through the drive head 48 in its operative position relative to its associated workstation 46.

The lathe 10 is computer controlled and, accordingly, includes a control cabinet 58 in which the relevant processing circuitry is mounted. An operator operates the lathe 10 via a control panel 60 on the control cabinet 58. It will be appreciated that, instead, the control cabinet 58 could form part of the housing 18.

In use, to load the magazine 14, the indexing plate 50 of the magazine 14 is raised out of engagement with the collet release system 52 of the drive head 48. The magazine 14 is then swivelled relative to the carriage 24 about the gimble arrangement 32 until it adopts a substantially horizontal orientation as shown in FIG. 2 of the drawings. The rods 38 are loaded into the magazine from the end 62. Once all the rods 38, including the spare workpieces, have been loaded, the magazine 14 is then again raised to its vertical orientation, shown in FIG. 1 of the drawings, such that the indexing plate 50 engages the collet release system 52 of the drive head 48.

The magazine 14 is rotated about its longitudinal axis until openings in the indexing plate 50 are brought into register with openings in the collet release system 52 of the drive head 48. When this occurs, the rods 38 drops under gravity through their associated collets. To control the position at which the rods 38 are placed relative to their associated workstations 46, the parting tool of each workstation 46 is placed in position beneath each rod 38 such that the end to be machined of each rod 38 drops on to the parting tool. The workstation head 40 is lowered with each rod 38 bearing against the top of its associated parting tool until the ends of the rods 38 are in their required positions relative to the workstation 46. The collets clamp the rods 38 in this position while the workstation head 40 is lowered further with respect to the housing 18. Various machining operations are then carried out on the end of each rod 38 by appropriate choice of tool, manipulation of the workstation head 40 and rotation of the rods 38 by the drive head 48 of the magazine 14. As each machining operation is completed, the workstation head 40 is indexed or rotated, in the x-plane, to bring the next tool into position relative to the end of the rod 38 to effect the machining operation which that tool is equipped to do on the end by the rod 38. Once machining has been completed, ie. the finished item has been formed, the final operation carried out at the workstation 46 is the parting of the finished item from the remainder of the end of each rod 38. This is effected by the parting tool which remains in position beneath the end of the rod 38 so that, when the finished item is parted from the end of the rod 38 and the collets are released, the rods 38 drop under gravity on to the parting tools again, as described above, to be brought into position relative to the workstations 46. When a supply of rods 38 has been exhausted, the magazine 14 is rotated relative to its plate 50 to bring a spare workpiece into alignrment with each opening in the plate 50 again to be fed through the drive head 48 to the workstation head 40.

It is to be noted that a swarf channel 64 is defined below the workstation head 40. A swarf conveyor or plate 66 feeds swarf into the channel 64 to clean out the channel 64. A cleaning finger (not shown) is mounted to extend into the channel 64 and, driven by a motor, swarf can be removed from the channel 64.

Coolant is directed on to the tool from galleries in the gear box fed up through the center column through holes adjacent to the collets. It acts as direct cooling on bearings in the gear box. Also, coolant is circulated back to the coolant tank in the housing 18 by internal drains under the swarf table 66.

It is a particular advantage of the invention that, due to the vertical mounting of the magazine 14, the footprint of the lathe 10 is smaller by approximately 90° than other lathes having horizontal magazines of which the applicant is aware. Further, feeding of the rods 38 to the workstations 46 is facilitated by the vertical orientation of the rods 38. Also, as the rods 38 are rotating about a vertical axis, lash of the rods 38 is inhibited resulting in a less noisy working environment. This also allows much higher speeds to take advantage of modern tools. Still further, hollow bar or tube can be readily machined as coolant is unable to flow up through the vertically arranged bar or tube.

Another major advantage of the invention is that multiple items can be manufactured simultaneously. In this regard it is to be noted that the lathe 10 could have any number of workstations 46 depending on the complexity of the components or items to be manufactured. Due to the fact that multiple items can be manufactured simultaneously, a very high production rate can be achieved with the resultant cost savings.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A lathe which includes
   a support structure including a support post and a carriage slidably supported on the support post;
   a multi-spindle magazine for holding a number of operative workpieces, the magazine being rotatably supported by the carriage of the support structure and being mounted on the support structure each workpiece is arranged substantially vertically when a machining operation is performed on said workpiece, the magazine being configured to hold spare workpieces in addition to each operative workpiece; and
   at least one workstation; having at least one working tool, mounted on the support structure such that a working tool engages an end of said workpiece to perform the machining operation while said workpiece is maintained in its vertical orientation.

2. The lathe of claim 1 in which the support past is mounted on a base plate and in which a housing is arranged on the base plate adjacent the support post.

3. The lathe of clam 2 in which a workstation head is mounted on the housing the workstation head defining the, or each, workstation.

4. The lathe of claim 3 in which the workstation head is displaceably arranged on the housing.

5. The lathe of any one of the preceding claims which includes a control means arranged intermediate the workstation head and an end of the magazine closer to the workstation head for controlling feeding of the, or each, workpiece to its associated workstation.

6. The lathe of claim 5 in which the control means includes a gripping means for releasably gripping the, or each, workpiece and a rotating means for rotatably driving the, or each, workpiece to enable the machining operation to be performed on the, or each workpiece.

7. The lathe of claim 1 in which a plurality of working tools is accommodated in said at least one workstation, said workstation being indexable relative to the magazine such that various machining operations can be sequentially carried out on a workpiece associated with said workstation.

8. The lathe of claim 1 which includes a plurality of workstations, one associated with each operative workpiece, so that the machining operation can be performed on each of the operative workpieces simultaneously.

* * * * *